(12) United States Patent
Boyer et al.

(10) Patent No.: US 9,306,820 B2
(45) Date of Patent: Apr. 5, 2016

(54) PROGRAMMABLE PRESENCE PROXY FOR DETERMINING A PRESENCE STATUS OF A USER

(71) Applicant: Avaya Inc., Basking Ridge, NJ (US)

(72) Inventors: David G. Boyer, Oceanport, NJ (US); Shabbir A. Khakoo, Morganville, NJ (US); Vipul Kishore Lalka, Matawan, NJ (US); Levent Sasmazel, Holmdel, NJ (US); Prem Sumetpong, Hazlet, NJ (US)

(73) Assignee: Avaya Inc., Basking Ridge, NJ (US)

( * ) Notice: Subject to any disclaimer, the term of this patent is extended or adjusted under 35 U.S.C. 154(b) by 201 days.

(21) Appl. No.: 13/943,173

(22) Filed: Jul. 16, 2013

(65) Prior Publication Data

US 2013/0304913 A1 Nov. 14, 2013

Related U.S. Application Data

(60) Division of application No. 12/212,241, filed on Sep. 17, 2008, now Pat. No. 8,487,770, which is a continuation of application No. 10/672,635, filed on Sep. 26, 2003, now abandoned.

(51) Int. Cl.
*G08B 23/00* (2006.01)
*H04L 12/26* (2006.01)
(Continued)

(52) U.S. Cl.
CPC .......... *H04L 43/0805* (2013.01); *H04L 12/581* (2013.01); *H04L 51/04* (2013.01); *H04L 61/1523* (2013.01); *H04L 67/24* (2013.01); *H04L 69/329* (2013.01)

(58) Field of Classification Search
CPC ... H04L 43/0805; H04L 67/24; H04L 69/329; H04L 61/1523; H04L 51/04; H04L 12/581; G08B 21/22
USPC ........... 340/573.1, 531, 539.1, 539.13, 573.4; 709/224, 228, 206, 207
See application file for complete search history.

(56) References Cited

U.S. PATENT DOCUMENTS 5,889,845 A 3/1999 Staples et al.
6,021,176 A 2/2000 McKendry et al.
(Continued)

OTHER PUBLICATIONS

Jeffery, John A., "U.S. Appl. No. 10/672,635 Decision on Appeal Jul. 17, 2008", Publisher: USPTO, Published in: US.
(Continued)

*Primary Examiner* — Anh V La
(74) *Attorney, Agent, or Firm* — Sheridan Ross P.C.

(57) ABSTRACT

A method and apparatus are provided that evaluate a number of different sources of presence information to determine a presence status of a user. The presence status of a user is determined by obtaining presence information from a plurality of presence data stores; translating the obtained presence information from at least one of the presence data stores into a standard format; and determining the presence status of the user based on the obtained presence information. Presence information can also be based on user-specified rules. Presence information is obtained from a number of presence data stores and the presence status of a user is determined based on one or more rules that are applied to the obtained presence information. The rules may include, for example, aggregation rules that determines the presence status based on one or more of the obtained presence information or filter rules that determine who may receive the presence status.

20 Claims, 4 Drawing Sheets

(51) Int. Cl.
*H04L 12/58* (2006.01)
*H04L 29/12* (2006.01)
*H04L 29/08* (2006.01)

(56) References Cited

U.S. PATENT DOCUMENTS

| | | |
|---|---|---|
| 6,188,888 B1 | 2/2001 | Bartle et al. |
| 6,892,222 B2 | 5/2005 | McDowell et al. |
| 7,171,221 B1 | 1/2007 | Amin et al. |
| 2003/0009530 A1* | 1/2003 | Philonenko et al. .......... 709/206 |
| 2004/0064567 A1 | 4/2004 | Doss et al. |
| 2004/0122901 A1* | 6/2004 | Sylvain .......................... 709/206 |
| 2004/0162882 A1 | 8/2004 | Mora |
| 2004/0170263 A1* | 9/2004 | Michael et al. ............. 379/201.1 |
| 2004/0186887 A1* | 9/2004 | Galli et al. .................... 709/206 |
| 2004/0203766 A1* | 10/2004 | Jenniges et al. ........... 455/435.1 |

OTHER PUBLICATIONS

La, Anh V., "U.S. Appl. No. 10/672,635 Evidence Relied Upon by Examiner Oct. 18, 2007", Publisher: USPTO, Published in: US.

La, Anh V., "U.S. Appl. No. 10/672,635 Examiner's Answer to Appeal Brief May 17, 2006", Publisher: USPTO, Published in: US.

La, Anh V., "U.S. Appl. No. 10/672,635 Office Action Mar. 28, 2005", Publisher: USPTO, Published in: US.

La, Anh V., "U.S. Appl. No. 10/672,635 Office Action Sep. 19, 2005", Publisher: USPTO, Published in: US.

Nolan, Patrick J., "U.S. Appl. No. 10/672,635 Order Returning Undocketed Appeal to Examiner Jul. 6, 2007", Publisher: USPTO, Published in: US.

* cited by examiner

FIG. 4

PRESENCE DATABASE – 400

| USER NAME (430) | PRESENCE STATUS (440) | DEVICE ADDRESS (450) | DEVICE CAPABILITY (460) | VOICE MAILBOX (470) |
|---|---|---|---|---|
| ... | ... | ... | ... | ... |
| USER A | BUSY | TEL: (732)-555-1212 | VOICE/TEXT | 732-555-1212<br>7325551212@voicemail.abccorp.com |
|  | AWAY | SIP: usera@laptop.abccorp.com | TEXT | usera@abccorp.com |
|  | ONLINE | SMTP: usera@abccorp.com | TEXT | usera@abccorp.com |
| ... | ... | ... | ... | ... |

410

PROGRAMMABLE PRESENCE PROXY FOR DETERMINING A PRESENCE STATUS OF A USER

CROSS-REFERENCE TO RELATED APPLICATIONS

This application is a division of U.S. patent application Ser. No. 12/212,241, filed Sep. 17, 2008, which is a continuation of U.S. patent application Ser. No. 10/672,635, filed Sep. 26, 2003, now abandoned, the content of which are incorporated by reference herein in their entirety.

The present application is related to U.S. patent application entitled "Method and Apparatus for Delivering an Electronic Mail Message With an Indication of a Presence Status of a Sender," application Ser. No. 10/672,636, filed Sep. 26, 2003, now abandoned, and U.S. patent application entitled "Method and Apparatus for Delivering a Voice Mail Message With an Indication of a Presence Status of a Sender," application Ser. No. 10/672,633, filed Sep. 26, 2003, now U.S. Pat. No. 8,706,090, each incorporated by reference herein.

FIELD OF THE INVENTION

The present invention relates generally to communication methods and systems, and more particularly, to methods and systems that determine the presence of a user based on multiple sources of presence information.

BACKGROUND OF THE INVENTION

A number of techniques have been proposed or suggested for determining whether or not a person is "present" at a given device. Herbsleb et al., "Introducing Instant Messaging and Presence Into the Workplace," Proc. of the Conf. on Human Factors in Computing Systems, Minneapolis, Minn., USA, ACM CHI 2002, 171-78 (Apr. 20, 2002), downloadable from http://www.informatik.uni-trier.de/-ley/db/conf/chi/chi2002.html (Electronic Edition (DOI: 1 0.1145/503376.503408)). As friends and colleagues become more distributed in time or location (or both), it becomes even more desirable for a user to determine, prior to a given communication attempt, whether or not the intended recipient of the contemplated communication is currently available at one or more communication devices. The provided presence information allows a user to make a more informed decision about how to best communicate with another person. In this manner, productivity is enhanced by enabling a better of the best to contact the other person. If the other person is present for a real time for example, the user can choose a real time or near real time mode of communication, such as a telephone call or an instant message. Otherwise, the user can select a non-real time mode of communicating, such as an email voice mail message or a page. This informed choice leads to a more efficient, productive and cost effective communication.

Instant messaging systems, for example, such as those offered by America Online (AOL), typically provide a mechanism for determining whether a message recipient is present. The presence information allows the recipient of an instant message to determine whether the sender of the instant message is currently available to receive additional instant messages. The presence information is generally determined based on user login activity (e.g., whether the user is currently logged on to the AOL service). Presence information based solely on login activity, however, can grow stale over time, since a user may remain logged in to an application for several days at a time. Thus, many systems supplement the user login activity with other determinable user activity, such as such as keyboard or mouse activity and whether a user remains idle for a time period exceeding a specified interval. Thus, existing presence awareness systems can distinguish between a user who is connected to the service (present) or not connected to the service (absent), and most systems allow some sort of busy or unavailable flag to be set. For example, some presence awareness systems have been extended to allow a user to affirmatively provide a personalized text message indicating his or her current availability, such as "out to lunch," or "in a meeting."

While existing presence awareness systems allow a user to make a more informed decision about how to best communicate with an intended recipient, they suffer from a number of limitations, which if overcome, could further improve the ability of users to efficiently communicate. For example, existing presence awareness systems are typically proprietary, closed architecture systems that only provide presence information within the domain of the service provider (i.e., one service subscriber can only determine if another service subscriber is present). For example, the presence function provided by America Online as part of its instant service (AIM) only provides presence information if both parties to an attempted communication subscribe to the AOL service. In addition, existing presence awareness systems do not support multiple, simultaneous log-ins, such as when a user has multiple devices providing information, such as an office computer and a personal digital assistant, or when a user remains logged in to a service from an office computer while attempting to log in to the same service from home. Rather, the older of the two attempted simultaneous sessions are generally automatically logged out of the service.

A need therefore exists for methods and systems that can evaluate a number of different sources of presence information to determine a presence status of a user. A further need exists for a method and apparatus for providing presence information in a variety of formats. Yet another need exists for a method and apparatus that can provide presence information based on user-specified rules.

SUMMARY OF THE INVENTION

The present invention provides methods and systems that evaluate a number of different sources of presence information to determine a presence status of a user. The presence status of a user is determined by obtaining presence information from a plurality of presence data stores; translating the obtained presence information from at least one of said presence data stores into a standard format; and determining the presence status of the user based on the obtained presence information. Generally, the presence status indicates if the user can be reached at one or more indicated devices or applications.

Another aspect of the invention provides presence information based on user-specified rules. Presence information is obtained from a number of presence data stores and the presence status of a user is determined based on one or more rules that are applied to the obtained presence information. The rules may include, for example, aggregation rules that determines the presence status based on one or more of the obtained presence information or filter rules that determine who may receive the presence status.

A more complete understanding of the present invention, as well as further features and advantages of the present

BRIEF DESCRIPTION OF THE DRAWINGS

FIG. 4 is a sample table from an exemplary presence database of FIG. 2.

DETAILED DESCRIPTION

Figure 1:
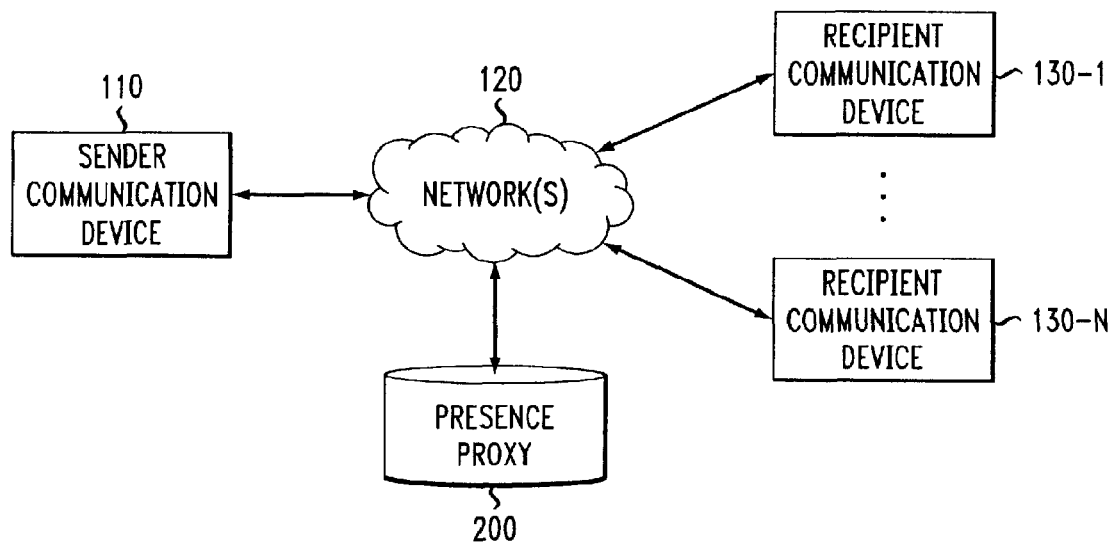
FIG. 1 illustrates a network environment m which the present invention can operate.

FIG. 1 illustrates a network environment in which the present invention can operate. As shown in FIG. 1, a sender employing a sender communication device 110 desires to 10 communicate over a network 120 with one or more intended recipients, each employing a corresponding recipient communication device 130-1 through 130-N. The communications devices 110, 130 may each be embodied as any communication device, such as a telephone, cellular telephone, computer, personal digital assistant (PDA), wireless email client, such as those commercially available from Blackberry™, or a Bluetooth-enabled device. The network(s) 120 may be any combination of public or private wired or wireless networks, such as the Internet, the Public Switched Telephone Network (PSTN) and Private Branch Exchange (PBX) switches, or a combination of the foregoing.

As used herein, the term "presence" shall mean the representation of a state characterizing the existence of an active device through which a user can communicate or through which presence can be detected. According to one aspect of the present invention, a user can have multiple, active communication devices 110, 130. The communications devices 110, 130 may each be embodied as any communication device, such as a telephone, cellular telephone, computer, personal digital assistant (PDA) or wireless email client, such as those commercially available from Blackberry™. The present invention provides a presence proxy 200, discussed further below in conjunction with FIG. 2, that keeps track of all of the communication devices 110, 130 registered to a user and the current presence state of each of these communication devices 110, 130. A user may also be present on multiple applications or portals at once (e.g., simultaneously logged on to an IM application and to a Web portal). In this manner, the present invention keeps track of the communication devices 110, 130 and applications that a user has available.

Extraction of Presence Information

Figure 2:
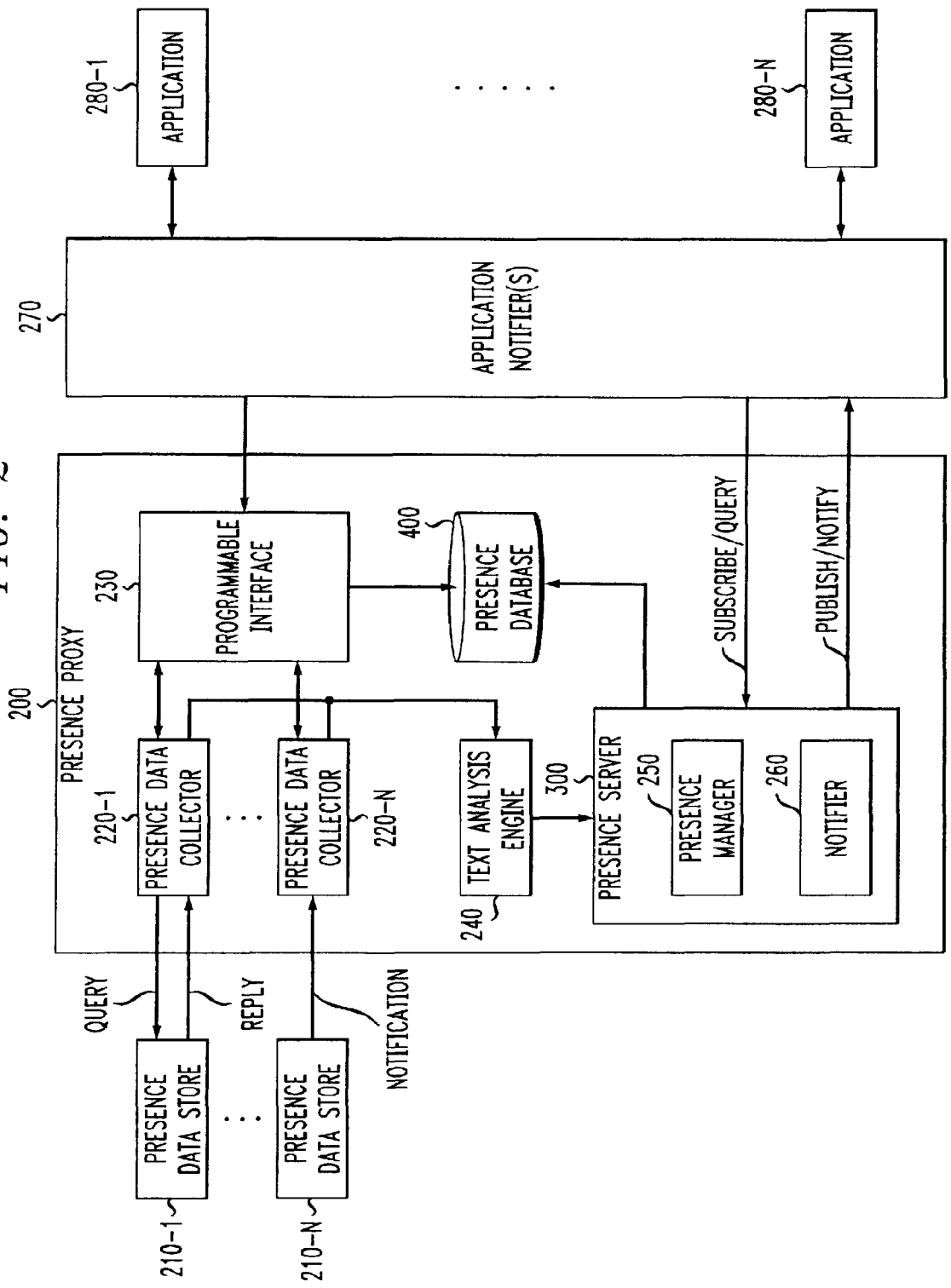
FIG. 2 is a schematic block diagram of an exemplary presence proxy of FIG. 1 incorporating features of the present invention.

FIG. 2 is a schematic block diagram of an exemplary presence proxy 200 of FIG. 1 incorporating features of the present invention. According to another aspect of the invention, the presence proxy 200 extracts presence information from multiple types of presence data stores 210-1 through 210-N and can receive presence notifications from the various data stores 210-1 through 210-N in a variety of formats. In the exemplary embodiment shown in FIG. a presence data collector 220-1 through 220-N is provided for each type of presence data store 210. Generally, the presence data stores 210 are grouped according to their ability to be processed by a single presence data collector 220. Each presence data collector 220 retrieves the desired presence information from the corresponding presence data store(s) 210. In this manner, if a presence data stores 210 changes or a new presence data stores 210 is added, only the corresponding presence data collector 220 needs to change.

For example, presence data collector 220-1 supports presence data store(s) 210-1 that can be queried for presence information. Thus, the presence data collector 220-1 can query the corresponding data store s) 210 at regular intervals to obtain the latest presence information. Examples of presence data stores 210-1 that can be queried to obtain presence information include Microsoft Exchange Servers, Lotus Notes Servers, Calendar Servers exposing an Internet Engineering Task Force (IETF) standards-based iCalendar interface, Common Profile for Instant Messaging (CPIM) documents and devices that comply with the Session Internet Protocol (SIP), as described, for example, in M. Handley et al., "SIP: Session Initiation Protocol," RFC 2543, March 1999.

In addition, presence data collector 220-N supports presence data store(s) 210-N that provide event based messaging systems to notify the presence data collector 220-N when there is a change in presence information. Examples of presence data stores 210-N that provide event based messaging systems include the Avaya Unified Communications Center Message Management Application, commercially available from Avaya, Inc. of Basking Ridge, N.J. Additional presence data collectors 220 (not shown) can also be provided to support communication devices 110, 130 that send out presence state changes, such as an iPAQ pocket PC commercially available from Hewlett-Packard Company, or a personal digital assistant from Palm, Inc. one implementation, a client-side application on such devices 110, 130 notifies a corresponding presence data collector 220 of any changes in presence information, and the presence data.

Generally, the presence proxy 200 converts or translates presence information extracted or obtained from the presence data stores 210 to a standard format. For example, if the presence data store 210-1 is a Lotus Notes Server, the presence data collector 220-1 can act as a Lotus Notes client to obtain the desired presence information. Likewise, if the presence data store 210-1 is a Microsoft Exchange Server, an application program interface (API), such as an API from the Microsoft Collaboration Data Objects library (CDO) can be employed to obtain the desired presence information. If the presence data store 210-1 is a Calendar Server that exposes an Internet Engineering Task Force (IETF) standards-based iCalendar interface, such as a Netscape Directory Server, the presence information can be extracted using the iCalendar interface. Generally, the presence data collectors 220 take care of the interaction between the presence proxy 200 and the various presence data stores 210. The extracted presence information is then translated to a standard format, if necessary. For example, the presence data collector 220 can convert extracted presence information to an XML document following the CPIM model.

The converted presence information can be analyzed, for example, by a text analysis engine 240 to identify events affecting the presence status of a user on one or more associated devices 110, 130 or applications. As discussed further below, the text analysis engine 240 can operate with a programmable interface 230 to recognize to recognize certain keywords that determine the presence of the user in accordance with user-specified rules. For example, a user can specify a rule stating that the user is busy during lunch. Thus, the text analysis engine 240 will monitor the presence information received from the various presence data stores 210, such as calendar applications, to determine if the user has specified a "lunch" time on a given day.

If a change is detected in the presence information of any user, the new presence status is recorded by a presence server 300, discussed further below in conjunction with FIG. 3, in a presence database 400, discussed further below in conjunction with FIG. 4. The presence server 300 queries the database 400 to determine if any application 280 is interested in this information.

Provisional of Presence Information

The presence proxy 200 provides presence information to an application in a format appropriate for the application. As shown in FIG. 2, the presence proxy 200 includes one or more notifiers 270 to provide presence information to one or more applications 280-1 through 280-N. Generally, the application notifiers 270 obtain presence information from the presence proxy 200 in a standard format, and convert the presence information from the standard format, if necessary, to the format(s) required by the requesting application 280. The presence information is sent to the requesting application 280 using one or more requested channels. This mechanism enables applications 280 to register (or subscribe) for presence information or to query the presence proxy 200 for this information. As shown in FIG. 2, the presence proxy 200 includes a proxy server 300, discussed further below in conjunction with FIG. 3, to process registrations and queries, and to provide the requested presence information to the applications 280. In this manner, the present invention supports (i) "fetching" applications 280 that ask for presence information when it is desired; and (ii) "watching" applications 280 that subscribe to a notification service and automatically receive presence information as it is updated.

If an application has registered for presence information, the presence server 300 provides the information to the application notifiers 270. The presence information can be published by the application notifiers 270 as a web service, or sent to an application 280 as a Java Message Service (JMS) message, as a SOAP (Simple Object Access Protocol) message or as a SIP notify message. For example, if the application 280 is an instant message application, a presence and availability agent, which is a part of a chat server, can update the presence information of all the users. The updated presence information is reflected on the buddy list of an instant messaging client, such as MSN Messenger, that monitors the presence of some of these users.

Programmable Interface

As shown in FIG. 2, the presence proxy 200 provides a programmable interface 230 to enable rule-based filtering and aggregation of the presence information. In this manner, the present invention supports the user-specification of logic that determines whether the user is actually "present." Thus, a user can define filtering rules that determine how the presence information of the user is shared with applications. In addition, a user can specify aggregation rules that determine when a user is present based on the information obtained from the various presence data stores 210. For example, a user can specify an aggregation rule stating that "whenever there is a conflict between an appointment in my Microsoft™ Outlook Calendar and my Palm™ Calendar, my presence shall always be determined based on the appointment specified in my Palm Calendar." In addition, the text analysis engine 240 can be trained to recognize certain keywords that determine the presence of the user. The text analysis engine 240 can analyze scheduled appointments/meetings for keywords and infer the presence information for the user according to the user's rules. For example, a user could create a rule that establishes his or her status as "busy" whenever the user has the "lunch" keyword in his appointments. Likewise, the user could create a rule that establishes his or her status as "unavailable" whenever the "tele-conf" keyword appears in the user's appointments.

Presence Server

Figure 3:
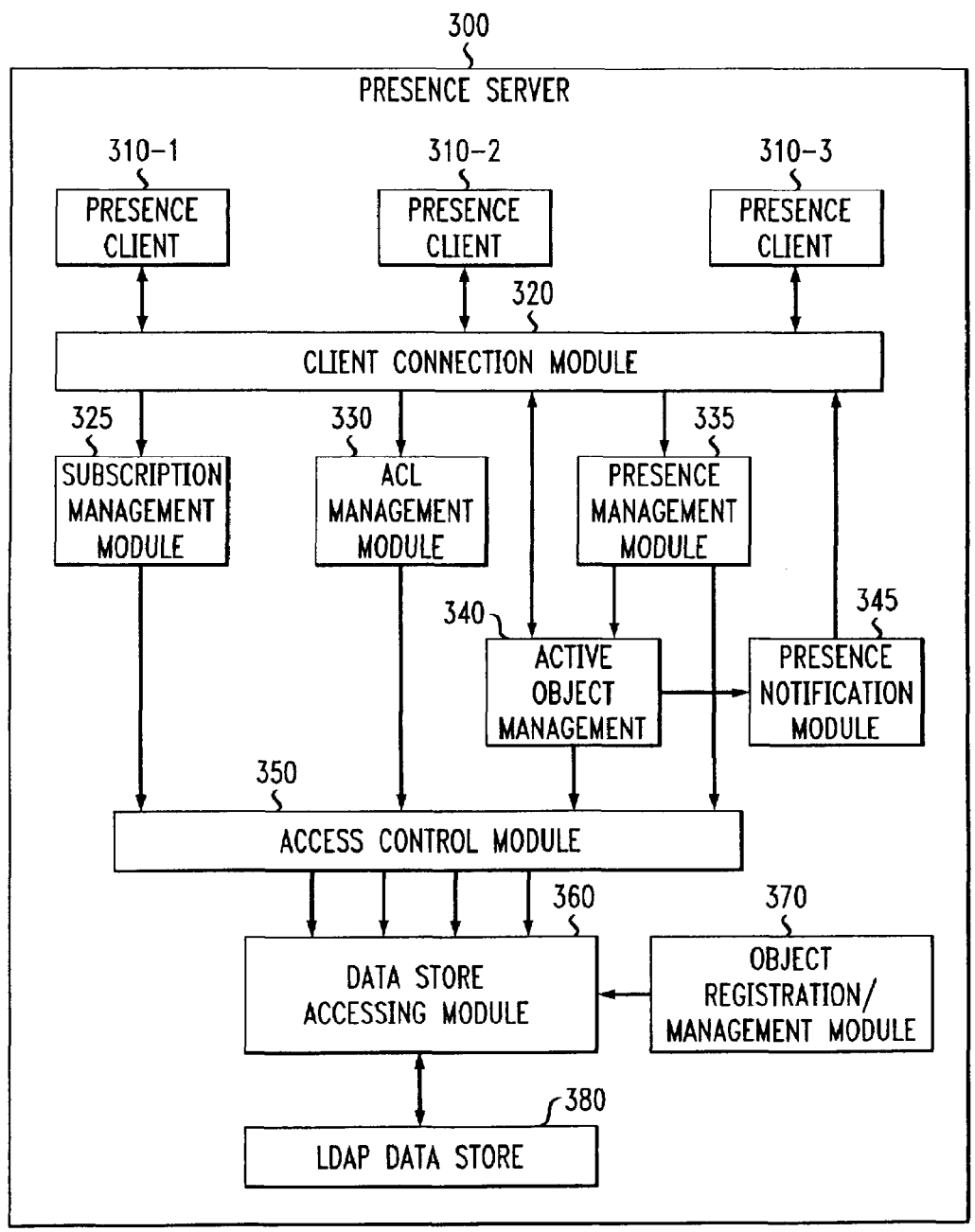
FIG. 3 is a schematic block diagram of an exemplary presence server of FIG. 2 incorporating features of the present invention.

FIG. 3 is a schematic block diagram of an exemplary presence server 300 of FIG. 2 incorporating features of the present invention. As previously indicated, the presence server 300 records presence information for each user, such as the availability of each user at one or more devices or applications (e.g., to receive email messages, instant messages or telephone calls to one or more indicated addresses or telephone numbers). The presence server 300 tracks real time changes in the presence status of each user that is used by the present invention to provide better communication when responding to an email message. The exemplary presence server 300 is implemented in accordance with the specifications of the emerging PAM architecture, described, for example, at www.pamforum.org. For example, the presence server 300 may be embodied in accordance with the teachings of David Boyer et al., "Presence Awareness for Future Telecommunication Systems", Ch. 4 in Virtual Reality Technologies for Future Telecommunications Algirdas Pakstas and Ryoichi Komiya (Eds.), John Wiley & Sons, LTD, (2002); or Mark Handel et al., "Requirements for Presence Awareness: The RVM Model," downloadable from http://www-personal.si.umich.edu/~handel/research/rvm/documents/rvm-model.pdf (2003).

As shown in FIG. 3, the presence server 300 includes a client connection module 320 that is responsible for managing client connections. The client connection module 320 facilitates communication between the presence server 300 and each client. In the exemplary implementation shown in FIG. 3, the client connection module 320 supports three client interfaces 310-1 through 310-3. A first client interface 310-1 provides a 'persistent' interface for presence applications. A persistent connection is maintained between the client and the server 300. A heartbeat mechanism can be utilized to make the system robust to network outages. Notifications are also sent via the first client interface 310-1. If a subscribed-to-users presence status changes (a new device is now available for communication), the user's client is sent a notification to indicate this.

A second client interface 310-2 supports non-persistent User Datagram Protocol (UDP) communications via a SIP proxy, discussed below, that provides notifications and registration to a well-known port number via the SIP notification and register protocol. See, J. Rosenberg et al., "SIP Extensions for Presence," IETF Internet Draft, dragft-rosenberg-impp-presence-00.txt (Jun. 15, 1300). A third non-persistent client interface 310-3 supports "thin" Web clients. A thin client does not support notifications. The client queries the server 300 periodically to see if the presence status of any of the parties that the user subscribes to has changed.

In addition, the presence server 300 includes a subscription management module 325 that is responsible for managing subscriptions. A subscription list, often referred to as a "buddy list," is a list of the people, groups and Web pages to whose presence and availability a user has subscribed. Examples include a stock price when it hits a certain level, the availability of a document when it is ready and the nearest fax machine that is not in use. A user might also subscribe to different applications that a user has access to or features of systems that change. For example, a user may want to know when someone hangs up his or her telephone (the identity subscribes to an agent's on-hook field). Subscriptions should also be permitted to an agent's presence information that might be considered to be networked appliances. For example, a homeowner could subscribe to a remote electronic doorbell.

The subscription management module 325 has a number of related modules that let a user groups and buddy lists. The subscription management module 325 supports the communication capabilities and, given the right permissions, a user can receive information about specific communications capabilities. A presence management module 335 allows a presence client to register or unregister its presence. Different clients can register unique devices and capabilities for a given user. Some clients can detect when a user has been idle. The presence module 335 is updated when an idle threshold is reached.

A presence notification module 345 notifies the clients about the presence change of other clients (or devices), that subscribed to the presence of the client. Notifications of presence state changes are sent to subscribed and on-line watchers (for the interfaces that support notifications). Users are also notified when someone they have been watching changes their accessibility to that user. If a user stops allowing a watcher to receive his/her presence information, the watcher is notified of this change in real time. This also applies to groups. The watcher of a group is sent a notice when his/her group membership is terminated.

An active object management module 340 maintains a list of currently connected clients and synchronizes the information with the data store. The object management module 340 also tracks active groups. When a user logs on, all groups that the user is a member of are updated to indicate his/her presence. If the user is the first present member in the group, the group now becomes active.

An access control list (ACL) management module 330 allows the users to manage their access control lists. An access control list lets a user indicate who they will allow to "watch" them (i.e., receive his or her presence information). It is important in an enterprise setting, for example, to allow users to specify who (other users and groups) is permitted to receive their presence data (note that this does not mean that all the users on the list will actually elect to subscribe to this user). Both 'Allow Lists' (no one except X, Y and Z is allowed access to my presence and availability information) and 'Deny Lists' (everyone except X, Y and Z is allowed access to my presence and availability information) are typically needed for Enterprise applications. Alternatively, a system might require users to grant a user's request for presence data in real time—a user is sent a message saying someone wants to add them to their permission subscription list and is asked to grant or not grant permission.

In most a user receives a notification when a new user wants to receive their presence information. This requires an explicit action each time a user wants to reject the subscription of another user to their information. In an enterprise setting, this may not be appropriate. An ACL system is used that allows only those users and groups to receive information for which this permission had been initially granted. Users can, if they desire, toggle this setting so that everyone gets their presence information except those who are explicitly listed as people who should not be permitted access to such data, in a known manner. For a group, the ACL list is used to indicate who is allowed to join the group. The member list is a list of those users who have actually joined the group. A group may be are open for anyone to join or may have a list of people who are allowed to join; yet everyone on the list may not elect to join the group. Groups can also have a separate subscription list.

A datastore accessing module 360 provides a common interface through which all the data access takes place. A Lightweight Directory Access Protocol (LDAP) datastore 380 is actively supported. The LDAP datastore 380 is a persistent repository for storing the information about the objects registered with the server. It is noted that new fields can be added to any object by a client. New fields do not require any changes to the presence server 300 (new fields are automatically created). These fields can also be subscribed to by a client.

The LDAP datastore 380 provides a presence database 400, as discussed further below in conjunction with FIG. 4, for each user in the community that indicates the availability of that user for receiving communication. For each user, the presence entry indicates whether the user is present and on what device. The presence status may indicate, e.g., whether the user is present, busy, away or gone (where "away" indicates that the user is around the physical location, but has stepped out briefly and "gone" indicates that the system has no knowledge of the presence of the user). The device address tab indicates the address of each device that is available. The presence server updates the presence and device address entries based either on automatic detection of presence of the user or by a process of manual registration by the user. If so, the presence server 300 is able to determine the address at which the user is available and the capabilities of the device at that address. For example, the presence server 300 can use information gathered from user log-ins, either to a machine or an application (or both) to determine presence information. In addition, determinable user activity, such as telephone, keyboard or mouse activity, provides presence information. In an enterprise setting, a private branch (PBX) switch can be monitored for a user's telephone usage and to initiate phone calls. A user's cellular telephone can be monitored to provide data on where the user is currently physically located.

The datastore accessing module 360 provides a generic interface to such different back-end datastores. An object registration and management module 370 is used to create and manage objects (users, groups, devices) and their information. Each user, group and device is represented in the system by objects. An access control module 350 ensures that an invoking object is authorized to access requested information before any information is accessed about any object.

FIG. 4 is a sample table from an exemplary presence database 400 maintained by the presence server 300. As indicated above, the presence database 400 maintains information for each user in the community, including the availability of each user to receive messages. As shown in FIG. 4, the presence database 400 includes a plurality of records, such as record 410, each associated with a different user. For each user, identified, for example, by name in field 430, the presence database 400 indicates the user's presence in field 440, corresponding device address and capabilities in fields 450 and 460, respectively, and the user's voice mailbox in field 470. The presence entry in field 440 indicates whether the user is present at a given device registered for the user. The device address in field 450 indicates the address of each device that is available for receiving messages for the user. The address can be any location or connection means, such as a telephone number or URL, for example. The device capability in field 460 indicates the capability of the device, such as whether the device is text or voice or video capable (or some combination of the foregoing), including email and fax capable devices. Finally, the voice mailbox in field 470 indicates the address of the voice mailbox for the user.

It is noted that the user-specified presence rules can be stored, for example, in a rules database, such as those in accordance with the Rule Markup Language (RuleML) of the Rule Markup Initiative, described for example, at http://www.dfki.uni-kl.de/ruleml/.

As previously indicated, the presence server 300 updates the presence and device entries based on the automatic detection of the presence of the user or by a process of manual registration by the user, in any known manner. Thus, the presence server 300 is always to determine whether a user is present. If present, the server 300 is able to determine the address(es) at which the user is available and the capabilities of the device at the address. In addition, the manual registration process allows a user to prioritize the indicated device and presence information, thereby allowing messages to be delivered in accordance with the user's preferences.

It is to be understood that the embodiments and variations shown and described herein are merely illustrative of the principles of this invention and that various modifications may be implemented by those skilled in the art without departing from the scope and spirit of the invention.

The invention claimed is:

1. A method comprising:
    obtaining, at a presence server, presence information from a plurality of presence data stores, wherein the presence information provides a clue as to a presence status of a user, wherein the plurality of presence data stores provides the presence information in disparate formats;
    aggregating, at the presence server, the presence information from the plurality of presence data stores according to an aggregation rule, to yield aggregated presence information;
    translating, at the presence server, the aggregated presence information into a standard format, yielding translated presence information; and
    determining, via a processor, the presence status based on the translated presence information.

2. The method of claim 1, wherein the presence status indicates whether the user can be reached for communication at a communication device.

3. The method of claim 1, wherein the presence information is obtained via a user registration process.

4. The method of claim 1, wherein the presence information is obtained by observing an activity of a user.

5. The method of claim 1, wherein obtaining the presence information is performed by a presence data collector.

6. The method of claim 5, wherein obtaining the presence information further comprises querying one of the plurality of presence data stores for the presence information.

7. The method of claim 1, wherein the plurality of presence data store comprises a device.

8. The method of claim 1, wherein the plurality of presence data store comprises an application.

9. The method of claim 1, wherein translating the presence information further comprises combining data obtained from the plurality of presence data stores.

10. A system comprising:
    a processor; and
    a computer-readable storage medium storing instructions which, when executed by the processor, cause the processor to perform operations comprising:
        obtaining, at a presence server, presence information from a plurality of presence data stores, wherein the presence information indicates a current presence status of a user, wherein the plurality of presence data stores provides the presence information in disparate formats;
        aggregating, at the presence server, the presence information from the plurality of presence data stores according to an aggregation rule, to yield aggregated presence information;
        translating, at the presence server, the aggregated presence information into a standard format, yielding translated presence information; and
        determining the current presence status of the user based on the translated presence information.

11. The system of claim 10, wherein the current presence status indicates whether the user can be reached for communication at a communication device.

12. The system of claim 10, wherein the computer-readable storage medium stores additional instructions which, when executed by the processor, cause the processor to perform further operations comprising querying one of the plurality of presence data stores for the presence information.

13. The system of claim 10, wherein the computer-readable storage medium stores additional instructions which, when executed by the processor, cause the processor to perform a further operation comprising receiving a message containing the presence information from one of the plurality of presence data stores.

14. The system of claim 10, wherein translating the presence information further comprises translating the presence information to a format appropriate for a recipient application, and wherein the computer-readable storage medium stores additional instructions which, when executed by the processor, cause the processor to perform a further operation comprising providing the current presence status to the recipient application.

15. A computer-readable storage device storing instructions which, when executed by a processor, cause the processor to perform operations comprising:
    obtaining, at a presence server, presence information from a plurality of presence data stores, wherein the presence information provides a clue as to a presence status of a user, wherein the plurality of presence data store provides the presence information in disparate formats;
    aggregating, at the presence server, the presence information from the plurality of presence data stores according to an aggregation rule, to yield aggregated presence information;
    translating, at the presence server, the aggregated presence information into a standard format, yielding translated presence information; and
    determining the presence status based on the translated presence information.

16. The computer-readable storage device of claim 15, wherein the presence information is obtained via a user registration process.

17. The computer-readable storage device of claim 15, wherein the presence information is obtained by observing an activity of a user.

18. The computer-readable storage device of claim 15, wherein obtaining the presence information is performed by a presence data collector.

19. The computer-readable storage device of claim 15, wherein the plurality of presence data store comprises a device.

20. The computer-readable storage device of claim 15, wherein the plurality of presence data store comprises an application.

* * * * *